(12) United States Patent
Eapen et al.

(10) Patent No.: US 11,544,218 B2
(45) Date of Patent: Jan. 3, 2023

(54) JSON TO BPMN CONVERSION SYSTEM

(71) Applicant: MORGAN STANLEY SERVICES GROUP INC., New York, NY (US)

(72) Inventors: Sujit Eapen, Plainsboro, NJ (US); Sathish Kannan, Staten Island, NY (US)

(73) Assignee: Morgan Stanley Services Group Inc., New York, NY (US)

( * ) Notice: Subject to any disclaimer, the term of this patent is extended or adjusted under 35 U.S.C. 154(b) by 256 days.

(21) Appl. No.: 16/836,677

(22) Filed: Mar. 31, 2020

(65) Prior Publication Data

US 2021/0303513 A1  Sep. 30, 2021

(51) Int. Cl.
*G06F 16/11* (2019.01)
*G06F 9/54* (2006.01)
*G06T 1/20* (2006.01)

(52) U.S. Cl.
CPC .............. *G06F 16/116* (2019.01); *G06F 9/54* (2013.01); *G06T 1/20* (2013.01)

(58) Field of Classification Search
None
See application file for complete search history.

(56) References Cited

U.S. PATENT DOCUMENTS

| | | |
|---|---|---|
| 9,836,549 B2 | 12/2017 | Heinrich et al. |
| 2004/0261017 A1* | 12/2004 | Perry .................... G06F 16/972 715/236 |
| 2005/0228765 A1* | 10/2005 | Huang .................... G06F 16/93 |
| 2006/0271849 A1* | 11/2006 | Thormaehlen ............ G06F 8/10 717/136 |
| 2009/0112652 A1* | 4/2009 | Kelsey ............. G06Q 10/06311 705/7.13 |
| 2013/0139164 A1 | 5/2013 | Balko |
| 2014/0188916 A1 | 7/2014 | Kieselbach et al. |
| 2014/0245233 A1 | 8/2014 | Bentov et al. |
| 2014/0250121 A1 | 9/2014 | Kieselbach et al. |
| 2015/0082271 A1 | 3/2015 | Damonte et al. |
| 2016/0034647 A1* | 2/2016 | Burchianti ......... G06Q 10/1093 705/2 |
| 2017/0351980 A1 | 12/2017 | Binder |
| 2018/0081645 A1 | 3/2018 | Iturri et al. |
| 2018/0081994 A1 | 3/2018 | Ron et al. |
| 2018/0165308 A1 | 6/2018 | Schubert |

(Continued)

*Primary Examiner* — Kim T Nguyen
(74) *Attorney, Agent, or Firm* — Weitzman Law Offices, LLC

(57) ABSTRACT

A system for converting a data file in a first format for data serialization into a second format for workflow specification is disclosed. The system comprises one or more processors and non-transitory memory storing instructions. When executed by the one or more processors, the instructions cause the one or more processors to receive a data file in the first format representing a workflow; automatically generate a functionally equivalent workflow specified according to the second format, via consultation with a correspondence table and replacing a set of elements from the first format with a corresponding set of elements from the second format; automatically fill in any default values required in the second format and not specified within the first format; and output the functionally equivalent workflow in the second format. In a preferred embodiment, the first format is JSON and the second format is BPMN 2.0.

18 Claims, 5 Drawing Sheets

(56) References Cited

U.S. PATENT DOCUMENTS

| | | | |
|---|---|---|---|
| 2019/0005228 A1* | 1/2019 | Singh | G06F 9/45558 |
| 2021/0019706 A1* | 1/2021 | Bhalla | G06Q 10/06315 |
| 2021/0089618 A1* | 3/2021 | Jain | G06Q 10/00 |
| 2021/0146543 A1* | 5/2021 | Cristache | B25J 9/1694 |
| 2021/0157858 A1* | 5/2021 | Stevens | G06F 16/90335 |
| 2021/0224671 A1* | 7/2021 | Cristache | G06F 40/216 |
| 2021/0303513 A1* | 9/2021 | Eapen | G06F 16/116 |
| 2021/0303748 A1* | 9/2021 | Malekian | G06F 30/12 |
| 2022/0040860 A1* | 2/2022 | Cristache | B25J 9/1635 |

* cited by examiner

JSON TO BPMN CONVERSION SYSTEM

FIELD OF INVENTION

This application relates to systems for and methods of automatically converting between structured data formats, and more specifically, for converting from an input describing a process in Javascript Object Notation (JSON) format to an output that is compliant with the Business Project Management Notation 2.0 (BPMN) specification.

BACKGROUND

Many businesses have workflows that are complex and prone to error due to a need to comply with a number of internal guidelines or external mandates. For example, hiring a new employee may involve requesting specific data from a candidate, ensuring the candidate's identity and that the candidate has authorization to work within the country, receiving an approval from the right actors in a human resources department, scheduling and conducting interviews, and sending out documents for the employee to sign. If the status is simply tracked on a paper form or in a spreadsheet, it is easier for steps to be omitted, performed but not recorded, or performed incorrectly or out of order, leading to confusion, inefficiency, or non-compliance with standards. If the business process can be accurately expressed in a machine-readable format, software can track the steps of the process, automatically notifying each actor when their action or input is needed, receiving confirmation that the step has been completed, and ensuring nothing falls through a crack due to human error.

A number of modern automated systems for managing workflows, such as IBM's Business Process Manager, the Pega CRM Suite, and the Camunda Stack, require or prefer that workflows be expressed according to the BPMN specification. Because BPMN is a very rigorous and complex specification, extensive training is needed to use it well and businesses often must pay for a consulting specialist to convert existing documentation into a BPMN-compliant form.

Thus, there are advantages to having a system that can quickly and accurately convert processes expressed in a format easier to learn than BPMN into data files that can be used in BPMN-only automation systems.

SUMMARY OF THE INVENTION

A system for converting a data file in a first format for data serialization into a second format for workflow specification is disclosed. The system comprises one or more processors and non-transitory memory storing instructions. The instructions, when executed by the one or more processors, cause the one or more processors to receive a data file in the first format representing a workflow; automatically generate a functionally equivalent workflow specified according to the second format, via consultation with a correspondence table and replacing a set of elements from the first format with a corresponding set of elements from the second format; automatically fill in any default values required in the second format and not specified within the first format; and output the functionally equivalent workflow in the second format.

In a preferred embodiment, that first format is JSON and that second format is BPMN 2.0.

A computer-implemented method of converting a data file in a first format for data serialization into a second format for workflow specification is also disclosed. The method comprises receiving a data file in the first format representing a workflow; automatically generating a functionally equivalent workflow specified according to the second format, via consultation with a correspondence table and replacing a set of elements from the first format with a corresponding set of elements from the second format; automatically filling in any default values required in the second format and not specified within the first format; and outputting the functionally equivalent workflow in the second format.

In some embodiments, the system may be incorporated into a blue-green deployment to allow for resiliency and for upgrading to more advanced systems without a loss in system availability.

In some embodiments, a template may dynamically ingest configuration files during the generation of a workflow in the second format, allowing for code reuse and more rapid development.

BRIEF DESCRIPTION OF THE DRAWINGS

Other aspects, features and advantages will become more fully apparent from the following detailed description, the appended claims, and the accompanying drawings, provided solely for purposes of illustration without restricting the scope of any embodiment:

DETAILED DESCRIPTION

In order to address the issues described above, a server is provided having an application programming interface (API) for receiving workflow specifications in one format and converting them to the BPMN specification, outputting the BPMN-compliant workflow to be used in future automation.

Figure 1:
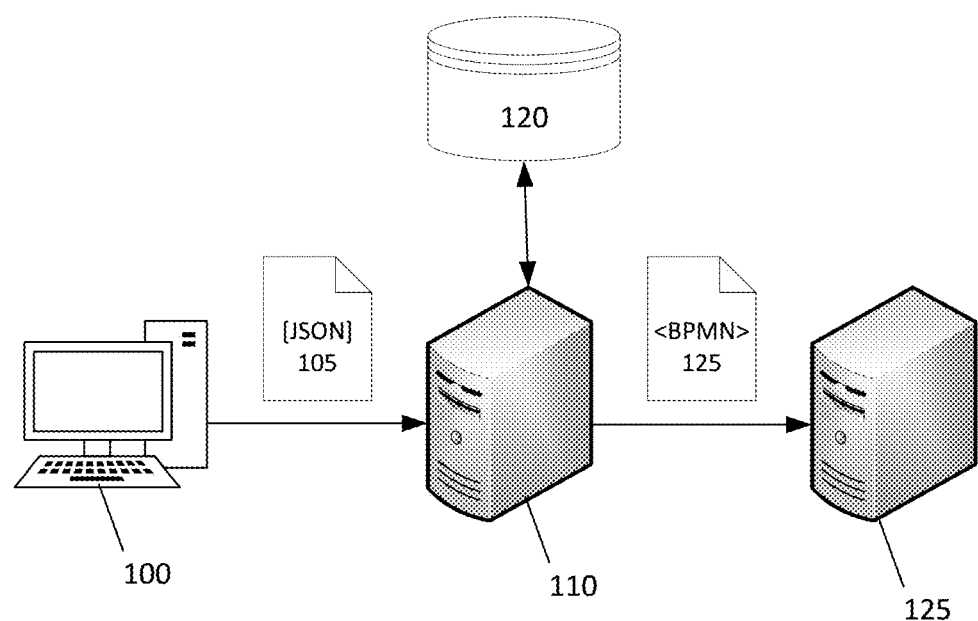
FIG. 1 depicts a network of computing devices for receiving a workflow in a first format, converting it to a BPMN-compliant form, and managing the workflow.

FIG. 1 depicts a network of computing devices to be used for receiving a workflow in a first format, converting it to a BPMN-compliant form, and managing the workflow.

After consulting with stakeholders, written materials, or other sources of information, a software developer uses a text editor or development environment on client computer 100 to express the workflow in a first machine-readable format 105 with which the software developer is familiar.

In a preferred embodiment, the software developer expresses the workflow in a Javascript Object Notation (JSON) format. JSON is widely-known among software developers as an intuitive and compact data-serialization format, and minimizes the amount of training a software developer may need to convert between oral/written instructions and a machine-readable format. Nevertheless, other variants of this disclosure could conceivably use other formats, such as YAML or a simpler form of XML distinct from BPMN, with appropriate changes to the conversion method.

When the workflow has been expressed in the machine-readable format, it is transmitted from the client 100 to a server 110. Various software, described further below, runs on server 110 to convert the workflow to a form 115 that is compliant with the BPMN specification.

Although the present disclosure relates primarily to conversion to the BPMN standard, the present methods could also be adapted for use in conversion to specifications other than BPMN, such as a HIPAA-compliant specification or other specifications used for niche business or governmental purposes.

In some embodiments, only a single server 110 may exist to handle incoming conversion requests. In other embodiments, blue-green deployment may allow for a stable production environment and a development/testing environment to exist side by side (a "blue" server and a "green" server), with requests normally being forwarded to the production environment by a router. However, if the production server is unavailable or if the development/testing environment is deemed ready for release, the router may be reconfigured to immediately begin forwarding requests to the non-production environment to maintain 24/7 availability.

After conversion, the BPMN form 115 may be stored in a database 120 for future usage or transmitted to a business process management server 125 to be used in automating workflows using previously described software such as IBM Business Process Manager. The business process management server 125 may be locally located on a same network with the server 110 or may represent a cloud-based solution with any number of servers providing the automation service from unknown locations.

Although a particular division of functions between devices is described in the system above, other configurations are possible in which functions are divided among devices differently. For example, as mentioned above, the functions of the server 110 might be divided among a cluster of servers; or the server 110 might also handle the automation of workflows instead of a separate server 125; or conversion of the workflow data might take place on the same computing device 100 that the software developer uses to input the workflow data in its initial format.

Figure 2:
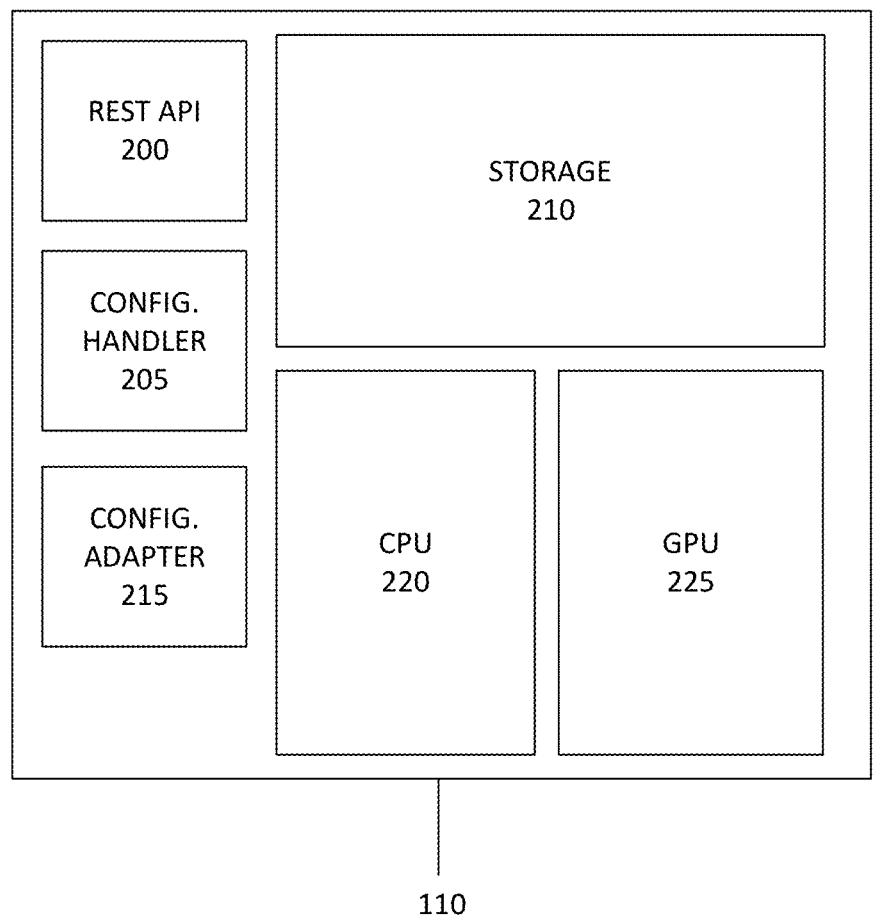
FIG. 2 depicts a number of software modules working in concert on a server to perform the conversion methods disclosed herein.

FIG. 2 depicts a number of software modules working in concert on the server 110 to perform the conversion methods disclosed herein.

The server 110, in a preferred embodiment, receives a request to generate a BPMN-compliant workflow via a representational state transfer (REST) API 200 from the client computer 100. Requests for conversion are forwarded from the REST listener 200 to a configuration handler 205 that determines, based on the request, whether the input workflow configuration is provided with the request or already present in memory and needs to be loaded from that memory. Storage 210 on the server 110 stores various previously-received configuration files, as well as any other code, such as Javascript libraries that may be needed to parse or transform the input. Finally, an adapter 215 receives the configuration file for a workflow in need of conversion, loads any other necessary configuration files or software libraries, and processes the input workflow to produce an equivalent output workflow via processing in the central processing unit (CPU) 220 of the server and/or the graphical processing unit (GPU) 225 of the server to take advantage of parallel processing.

Figure 3:
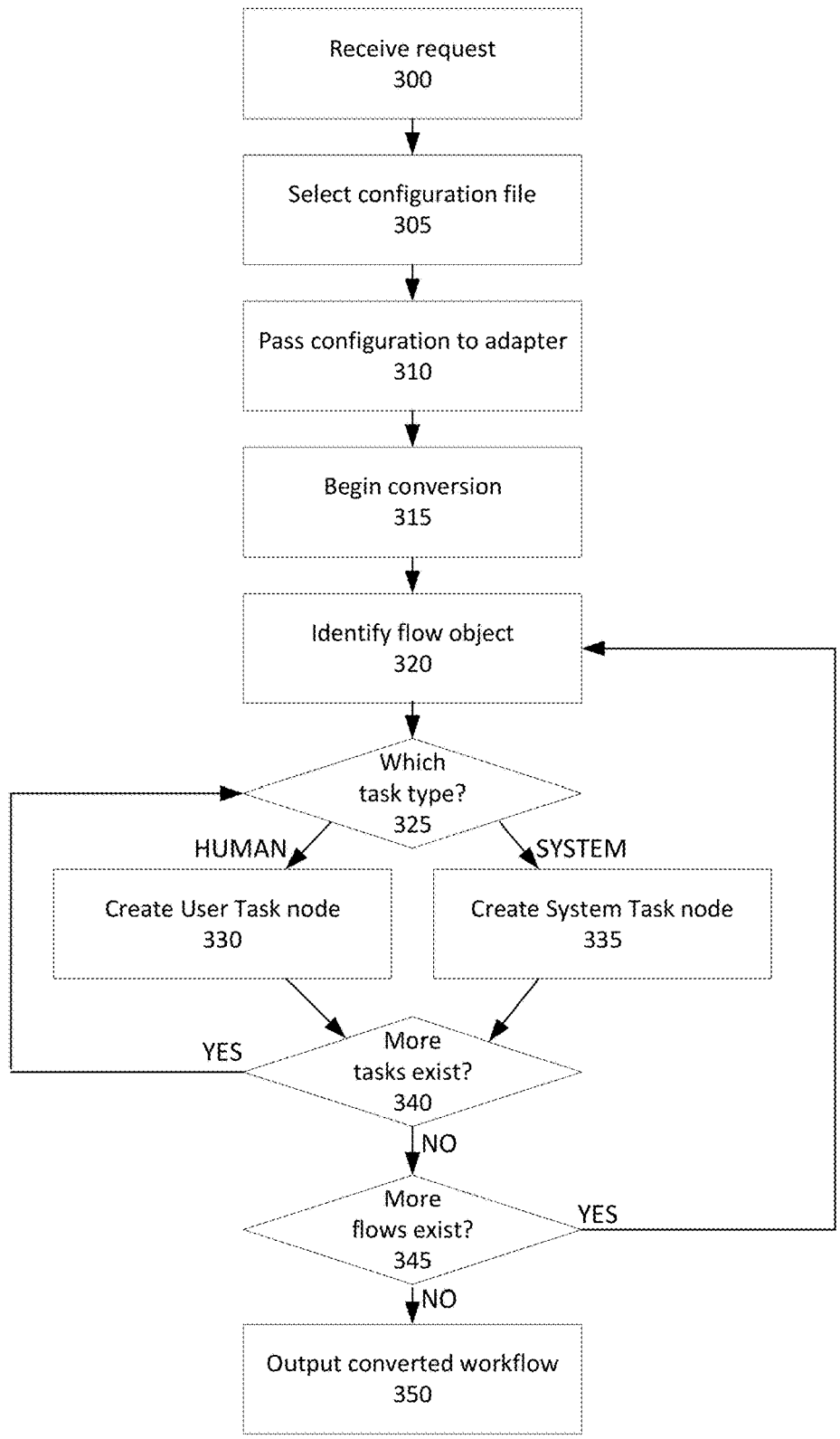
FIG. 3 depicts a method of receiving and converting a file to comply with the BPMN specification.

FIG. 3 depicts in greater detail the method of receiving and converting a file to comply with the BPMN specification.

Initially, after receiving the request to generate an equivalent workflow via the REST interface (Step 300), it is determined which configuration file specifying a workflow should be used as the input for the conversion (Step 305). In some cases, the configuration file may be included with the request, while in other cases the configuration file is already stored in the storage 210.

The determined configuration file is then fetched from storage if necessary and passed on to the adapter 215 (Step 310).

The adapter 215 receives the configuration file and the input and begins the conversion process (Step 315), identifying a representation of a Flow Object that is present in the configuration file (Step 320).

In a preferred embodiment, a flow object including a series of tasks is stored in the configuration file in an array, "actions", a member of the JSON object, such that actions[0] is a first task, actions[1] is a second task, and so on. Thus, the a node stating "<flowObject componentType="activity"></flowObject>" may be created within the output file whenever an "actions" array is detected in the input configuration. In general, a correspondence table may be used to store a set of textual triggers to search for, and a corresponding set of text in the output format to replace the trigger with.

Within each flow object, the adapter iterates over each step of the workflow to determine whether it is a task for a human or a task for the system (Step 325).

If the next workflow task is for a human, a BPMN User Task node is created (Step 330), indicated by "<component><bpmTaskType>1</bpmTaskType></component>", and various properties may be filled in from the input file, such as the task Name (possibly indicated by "actions[i].config.uiAction[i].stepName"), Potential Owner of the task (possibly indicated by "actions[i].config.rolesForTeam"), the task Priority, the task Due Date, the task Expiration, the task Escalation Period, and the Work and Holiday Calendar for that task.

Other qualities of a task that may be set via the configuration may include Maker/Checker distinctions (providing that when a human is tasked with verifying work created in a previous human task, the verifier must be a different human from the creator rather than allowing a person to confirm their own work), Sticky Tasks (indicating that if a first person performs a task and a second person verifies it or otherwise works on it, a subsequent task in the flow should be reassigned to the same first person rather than an arbitrary available human user), Autoclaim (assigning a task to an available human user instead of waiting for a human to claim the task), or other dynamic workflow assignment considerations.

If the next workflow task is instead for the system, a BPMN Service Task node is created (Step 335), indicated by "<component><bpmTaskType>3</bpmTaskType></component>", and further information such as a task Name, Service Name, and Service Parameters may be loaded from the configuration. A specified service may be, for example, generating documents for human signature and transmitting them to the correct human, determining that a necessary file has been received and stored in a database, or otherwise verifying and manipulating data already generated during a workflow's performance.

For each task, some elements may need to be generated for the BPMN notation that need not be specified by the developer when expressing the workflow in the initial format. For example, BPMN nodes may need to have a globally unique identifier (GUID), which can be generated by the adapter when creating those nodes.

When there are no more tasks in a flow object (Step 340), if there are more flow objects (Step 345), such as parallel swimlanes requiring concurrent, parallel action by multiple actors, the next flow object is processed (back to Step 320).

If there are no more flow objects in need of conversion, the completed BPMN file is output, ready for importation into a business project management server (Step 350).

When the server 110 has a GPU, iteration over tasks and flow objects may be greatly sped by having the GPU perform conversions in parallel, as GPUs are specialized for parallel processing in other contexts. While the complexity of some workflows and their BPMN equivalents may be so great that a single CPU would take an hour to generate the code output, parallel processing can produce a usable result in a fraction of the time. The adapter can also potentially process multiple workflows simultaneously, batching nodes in need of conversion and sending them off to the GPU for processing in parallel. As a result, the cycles of actions from steps 325-340, or from steps 320-345, may all occur substantially simultaneously, rather than sequentially.

In some instances, there may be substantial overlap in overall processes; for example, in an investment management company, the workflows for purchasing a stock, purchasing a bond, and purchasing another asset may largely be the same, with slightly different security or sanity checks built in based on the specific asset. For another example, a particular security check may be used in a variety of contexts, and updating security may involve changing every instance where that security check was used, allowing a possibility for human error during the change. There are significant advantages to creating a single "Asset Purchase" template that imports specific elements based on the asset type, or creating a single "Security" workflow that can be imported into each other workflow as those workflows are generated, such that a change may be propagated to many workflows by changing a single template and re-generating those workflows.

Figure 4:
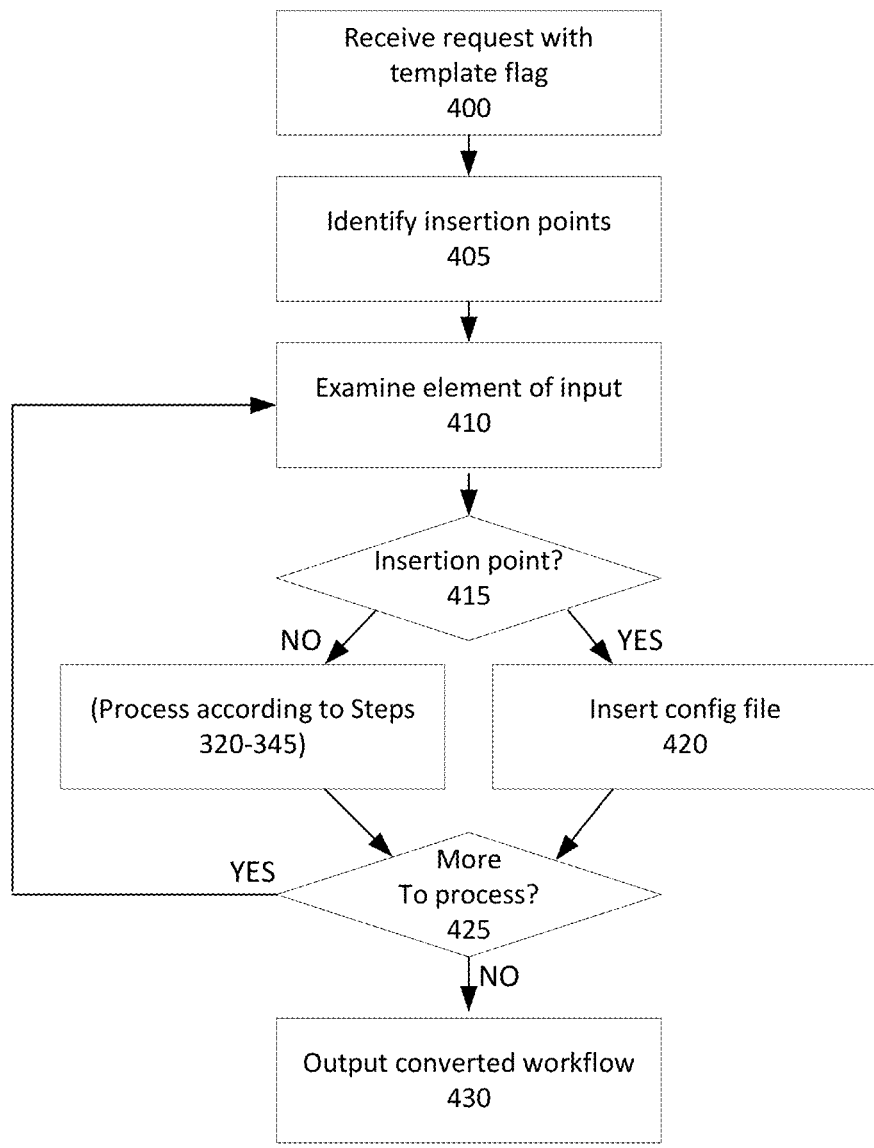
FIG. 4 depicts a method of dynamically ingesting a configuration file into a template during generation of a BPMN-compliant workflow.

FIG. 4 depicts a method of dynamically ingesting a configuration file into a template during generation of a BPMN-compliant workflow.

If the REST API receives a request with a template flag set to true (Step 400), the adapter will search the configuration for any instances of a placeholder or import statement indicating that a second configuration must be incorporated at that point (Step 405).

Conversion then occurs as normal, going through each element of the input configuration (Step 410) and processing as before, with the caveat that when one of the placeholders or import statements is encountered (Step 415), a corresponding configuration file indicated by that placeholder is inserted and used in the output BPMN (Step 420). When the input configuration is completely processed (Step 425), the adapter outputs the resulting BPMN workflow that has been generated (Step 430).

Figure 5:
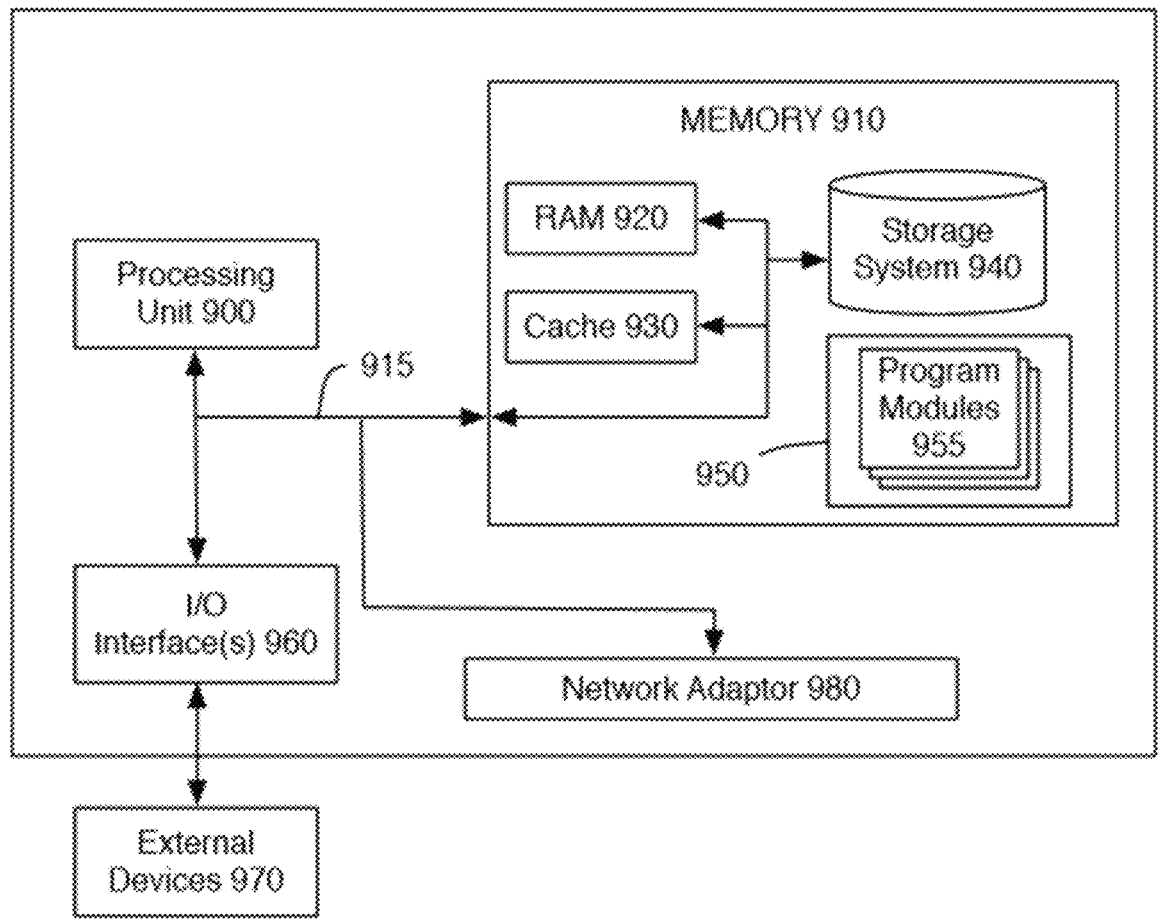
FIG. 5 is a high-level block diagram of a representative computing device that may be utilized to implement various features and processes described herein.

Although FIGS. 1 and 2 depict a preferred configuration of computing devices potentially using parallel computing to accomplish the software-implemented methods described above, those methods do not inherently rely on the use of any particular specialized computing devices, as opposed to standard desktop computers and/or web servers. For the purpose of illustrating possible such computing devices, FIG. 5 is a high-level block diagram of a representative computing device that may be utilized as a server 110 to implement various features and processes described herein. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 5, the components of the computing device may include (but are not limited to) one or more processors or processing units 900, a system memory 910, and a bus 915 that couples various system components including memory 910 to processor 900.

Bus 915 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 900 may execute computer programs stored in memory 910. Any suitable programming language can be used to implement the routines of particular embodiments including C, C++, Java, assembly language, etc. Different programming techniques can be employed such as procedural or object oriented. The routines can execute on a single computing device or multiple computing devices. Further, multiple processors 900 may be used.

The computing device typically includes a variety of computer system readable media. Such media may be any available media that is accessible by the computing device, and it includes both volatile and non-volatile media, removable and non-removable media.

System memory 910 can include computer system readable media in the form of volatile memory, such as random access memory (RAM) 920 and/or cache memory 930. The computing device may further include other removable/non-removable, volatile/non-volatile computer system storage media. By way of example only, storage system 940 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 915 by one or more data media interfaces. As will be further depicted and described below, memory 910 may include at least one program product having a set (e.g., at least one) of program modules that are configured to carry out the functions of embodiments described in this disclosure.

Program/utility 950, having a set (at least one) of program modules 955, may be stored in memory 910 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 970 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 960.

In addition, as described above, the computing device can communicate with one or more networks, such as a local area network (LAN), a general wide area network (WAN) and/or a public network (e.g., the Internet) via network adaptor 980. As depicted, network adaptor 980 communicates with other components of the computing device via bus 915. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A system for converting a data file in a first format for data serialization into a second format for workflow specification, comprising:
    one or more processors, and
    non-transitory memory storing instructions that, when executed by the one or more processors, cause the one or more processors to:
    receive a data file in the first format representing a workflow;
    automatically generate a functionally equivalent workflow specified according to the second format, wherein the second format is a version of the Business Process Management Notation (BPMN) specification, via consultation with a correspondence table and replacing a set of elements from the first format with a corresponding set of elements from the second format;
    automatically fill in any default values required in the second format and not specified within the first format; and
    output the functionally equivalent workflow in the second format.

2. The system of claim 1, wherein the version of the Business Process Management Notation is Business Process Management Notation 2.0.

3. The system of claim 1, wherein the first format is Javascript Object Notation (JSON).

4. The system of claim 1, wherein the data file is stored in memory until a later request triggers conversion to the second format.

5. The system of claim 4, wherein the data file is imported into, a second data file dynamically during the automatic generation of the functionally equivalent workflow.

6. The system of claim 1, wherein the system comprises at processor that performs parallel processing of multiple nodes of the data file in the first format to simultaneously convert them to an equivalent form in the second format.

7. The system of claim 6, wherein the processor that performs parallel processing is a graphical processing unit (CPU).

8. The system of claim 1, wherein a representational state transfer application programming interface (REST API) is provided to trigger the automatic generation of the functionally equivalent workflow.

9. The system of claim 1, wherein two distinct computing devices in a blue-green deployment topology each have one or more processors executing instructions to automatically generate the functionally equivalent workflow if a router directs a request to that distinct computing device.

10. A computer-implemented method of converting a data file in a first format for data serialization into a second format for workflow specification, comprising:
    receiving a data file in the first format representing a workflow;
    automatically generating a functionally equivalent workflow specified according to the second format, wherein the second format is a version of the Business Process Management Notation (BPMN) specification, via consultation with a correspondence table and replacing a set of elements from the first format with a corresponding set of elements from the second format;
    automatically filling in any default values required in the second format and not specified within the first format; and
    outputting the functionally equivalent workflow in the second format.

11. The method of claim 10, wherein the version of the Business Process Management Notation is the Business Process Management Notation 2.0.

12. The method of claim 10, wherein the first format is JSON.

13. The method of claim 10, wherein the data file is stored in memory until a later request triggers conversion to the second format.

14. The method of claim 13, wherein the data file is imported into a second data file dynamically during the automatic generation of the functionally equivalent workflow.

15. The method, of claim 10, further comprising using a processor to perform parallel processing of multiple nodes of the data file in the first format and simultaneously convert them to an equivalent form in the second format.

16. The method of claim 15, wherein the processor that performs parallel processing is a GPU.

17. The method of claim 10, further comprising providing a REST API to trigger the automatic generation of the functionally equivalent workflow.

18. The method of claim 10, further comprising: upon receiving a request to automatically generate the functionally equivalent workflow, selecting one device of multiple devices in a blue-green deployment topology to perform the automatic generation.

* * * * *